Patented Aug. 19, 1947

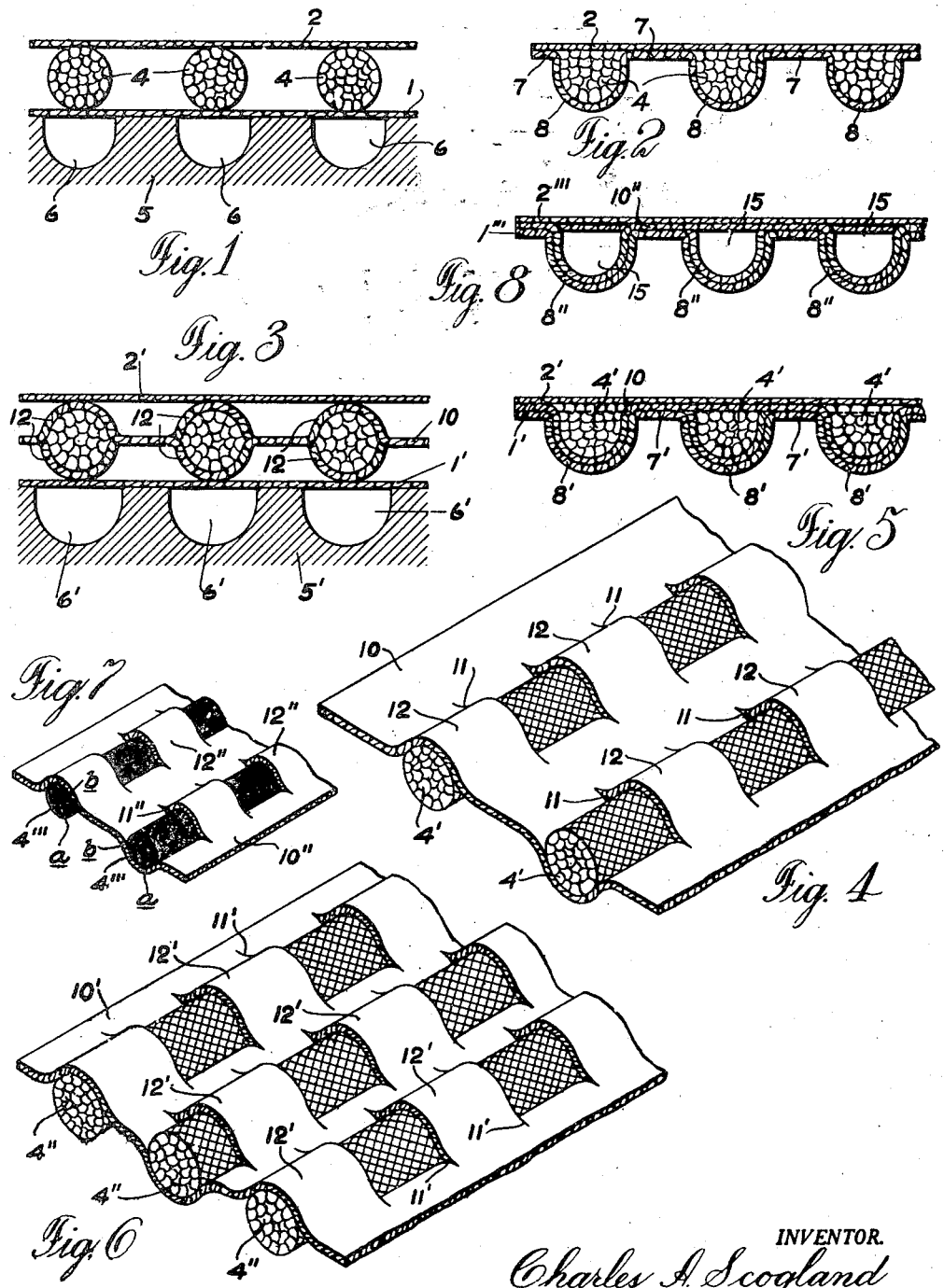

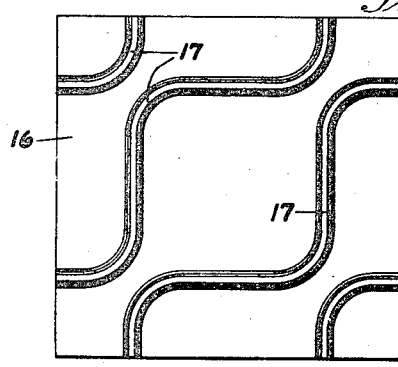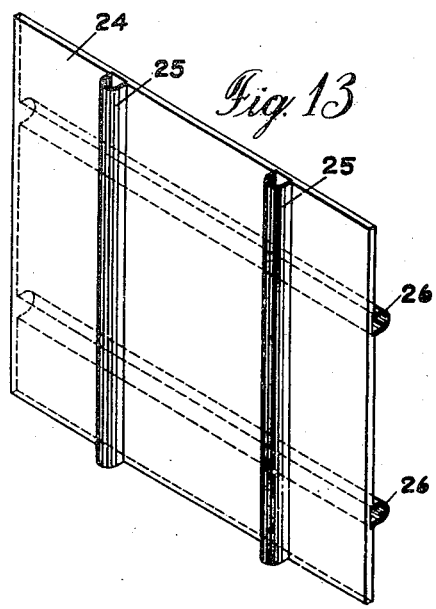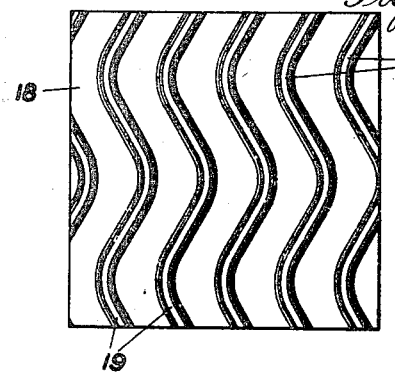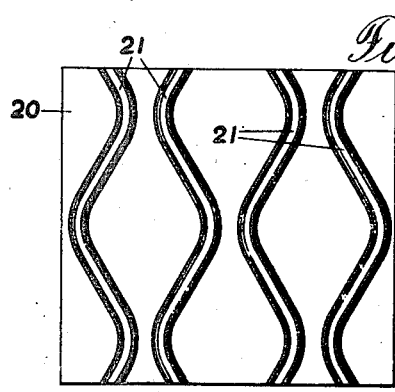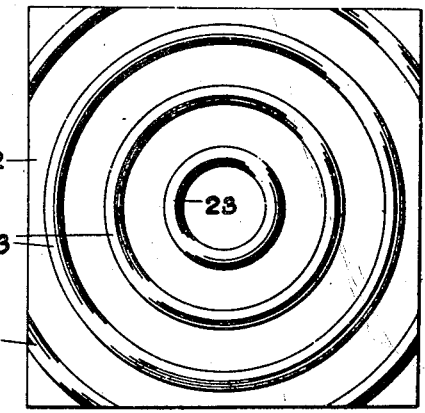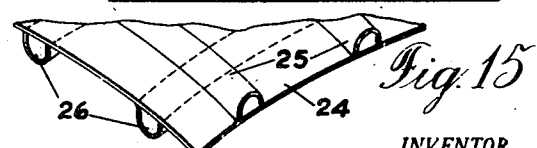

2,426,058

UNITED STATES PATENT OFFICE 2,426,058

PLASTIC SHEET MATERIAL AND METHOD

Charles A. Scogland, South Bend, Ind., assignor to The Studebaker Corporation, South Bend, Ind., a corporation of Delaware Application March 19, 1945, Serial No. 583,527

7 Claims. (Cl. 154—110)

This invention relates, in general, to plastic sheet material, and has particular relation to laminated plastic sheet material of ribbed or corrugated form for strength, and to the method of forming such material.

The invention may be characterized as an improvement upon the inventions disclosed and claimed in my copending applications Serial No. 509,838, filed November 11, 1943, and Serial No. 558,686, filed October 14, 1944.

The ribbed and laminated plastic sheet material of the present invention is adapted for use as a structural material for the component parts of automotive vehicle bodies—for example, for rear deck doors, or inside the roof—for insulation and finish for the top, sides, and other parts of station wagons; also for homes, and for other purposes wherever a plastic material having strength and lightness in weight is desired. It may also be used for ornamental purposes and for all similar purposes and combinations thereof.

The problem of forming ribbed and laminated plastic sheet material has not, prior to my inventions, been met satisfactorily from the economic and production standpoints. Prior products, of which I am aware, are unsatisfactory in that excessive time is required to carry out the steps necessary to form the same. One prior product is formed by wrapping a plurality of cores with resin impregnated sheets, and then placing the cores between layers of plastic impregnated sheet material. The assembly or body thus formed is then heated and pressed to unite the wrappings of the cores to the plastic impregnated sheets. The cores are then removed, leaving a cored laminated structure. The production problem of building laminated structures with this material is not economically feasible, due to the time and effort required in the wrapping of each individual core.

Moreover, in the manufacture, for example, of the component parts of the bodies for automotive vehicles, and in other uses for ribbed and laminated plastic sheet material, it is frequently necessary to curve the material in one or more directions or otherwise to contour the material in a manner not feasible with previously proposed materials of this sort.

One of the main objects of the present invention is to provide a novel sheet of ribbed or corrugated and laminated plastic material, and a novel method of forming the same, which sheet and method are economically feasible for mass production.

Another object of the invention is to provide sheet material of the class described which may be effectively and expeditiously curved in one or more directions and otherwise contoured for application in a wide range of installations, and without distorting the ribbed or corrugated formation of the sheet; also without impairing its mechanical strength or its appearance.

Another object of the invention is to provide plastic sheet material of the class described which is light in weight, possesses exceptional mechanical strength, and will acquire a high polish of pleasing appearance.

Another and more specific object of the invention is to provide plastic sheet material of the class described, comprising superimposed layers of plastic impregnated sheet material formed on deformable cores to produce the desired strengthening ribs or corrugations in the material and in which the deformable cores are adapted to be left in place during curving or contouring of the sheet, so that the curving or contouring operation may be performed effectively and expeditiously and without distorting the ribbed or corrugated formation and without impairing the mechanical strength or appearance of the sheet.

According to one embodiment of the present invention, the deformable cores are adapted to be left as a component part of the completed sheet material for added strength, and, in another embodiment of the invention, the deformable cores have a filling which is adapted to be blown out or otherwise removed or eliminated after curing by heat and pressure.

Another object of the invention is to provide improved means for assuring and facilitating the desired positioning of the cores and, more particularly, as a component part of the sheet material, an intermediate plastic impregnated layer having slits through which the cores are threaded, laced or woven for the purpose set forth.

Other objects and advantages of the invention will appear from the following detailed description, taken in connection with the accompanying drawings in which:

Figure 1 is a transverse sectional view of an arrangement of cores and layers of plastic impregnated sheets, illustrating one manner in which my present invention may be practiced;

Figure 2 is a transverse sectional view of a ribbed and laminated plastic sheet formed with the arrangement of cores and plastic impregnated layers shown in Figure 1;

Figure 3 is a transverse sectional view of another embodiment of the invention employing an intermediate plastic impregnated layer having slits through which the cores are threaded or woven to assure and facilitate the desired positioning of the cores;

Figure 4 is a fragmentary perspective view of the intermediate plastic impregnated layer employed in the embodiment of the invention illustrated in Figure 3, and showing the threading or weaving of the cores through the slits in the intermediate layer;

Figure 5 is a transverse sectional view of a ribbed and laminated plastic sheet formed with the arrangement of the cores and plastic impregnated layers shown in Figures 3 and 4;

Figure 6 is a fragmentary perspective view similar to Figure 4, and showing a modified arrangement of the slits in the intermediate layer;

Figure 7 is a fragmentary perspective view similar to Figures 4 and 6, but on a reduced scale and showing cores of a different form;

Figure 8 is a transverse sectional view of a ribbed laminated plastic sheet formed in accordance with Figure 3, but with the intermediate plastic layer and cores of Figure 7 substituted for the intermediate layer and cores of Figure 3 and after the sheet has been cured and the filling has been blown out or otherwise removed or eliminated from the cores;

Figures 9, 10 and 11 are side elevational views of panels or pieces of sheets embodying the present invention, and showing some of the different contours that may be imparted to the strengthening ribs or corrugations;

Figure 12 is a view of one edge of the sheet shown in Figure 9;

Figure 13 is a perspective view of another form of sheet embodying the invention and showing one arrangement of strengthening ribs or corrugations on opposite sides of the sheet;

Figure 14 is a view of another form of sheet, similar to Figures 9, 10, and 11, showing another contour that may be imparted to the strengthening ribs or corrugations; and Figure 15 is a perspective view of a sheet with a compound curvature embodying the present invention.

Referring now to the drawings, in Figure 1 I have shown two layers of plastic impregnated sheet material, one arranged in generally parallel relation above the other to form a bottom layer 1 and a top layer 2. The top layer 2 may be formed of plastic impregnated paper or fabric. The bottom layer 1 may also be formed of plastic impregnated paper or fabric which will deform as it is formed about the cores, as will be presently described.

A plurality of deformable cores 4 are arranged to extend lengthwise in substantially parallel relation with respect to each other, between the bottom and top layers 1 and 2. The cores 4, according to the present invention, are in the form of strands of rope, each strand formed of twisted and intertwined fibers. These rope cores 4 are deformable, which is a highly important aspect of the invention.

For purposes of a specific disclosure of the invention in accordance with the embodiment of Figure 1, the sheet 2 may be a high tensile plastic paper, and is preferably used with the intent of giving a highly polished surface, although, of course, this may vary within the broader aspects of the invention. Phenolic impregnated laminating sheet material, identified as grade #55 and furnished on the open market by the Detroit Wax Paper Company, of River Rouge, Michigan, is one suitable material for this purpose. In practicing the invention in accordance with this embodiment, proper positioning of the cores may be assured and facilitated, for example, by placing them on strips of pressure sensitive Scotch tape to form a ladder-like assembly. In the illustrated embodiment of the invention, the rope core elements 4 are spaced about one diameter distance from each other, but this may vary.

The layers 1 and 2 and rope cores 4 are arranged, as shown, over a mold member 5, with the bottom layer 1 on the adjacent surface of the mold member and the rope cores 4 in register with longitudinally extending and parallel molding channels or cavities 6. The channels or cavities 6 are shown of generally semi-circular cross section. The entire assembly is then placed, for example, between the platens of a suitable press. The platens of the press are preferably provided with suitable thermostatically controlled heating means, or other provision is made for simultaneously applying heat and pressure for molding the layers 1 and 2 and core 4 into the form of the desired sheet. The pressure is applied at right angles to the planes of the sheets 1 and 2.

The pressure which is applied presses the deformable cores 5 and the adjacent portions of the layer 1 down into the molding channels or cavities 6, and the layer 2 down upon the intervening portions 7 of the layer 1, bringing the layers 1 and 2 and the cores 4 into the relation shown in Figure 2.

In actual practice of the invention in accordance with this embodiment, I maintain the platens at a temperature of about 325° F. Pressure was gradually applied to the platens until it attained about 300 pounds per square inch. The body was permitted to cure at this temperature for approximately ten minutes.

The assembly was then removed from the press, thus producing the ribbed and laminated plastic sheet material as shown in Figure 2, with the layers 1 and 2 and deformable cores 4 firmly and securely bound together into a unitary structure. As shown in Figure 2, one side of this laminated sheet material has a smooth surface which acquires a high polish and is of pleasing appearance. The other side has the longitudinally extending and parallel ribs 8 thereon. These ribs 8, with the rope cores 4 forming a unitary part of the structure, provide exceptional mechanical strength. Where it is desired to curve the laminated and ribbed sheet in one or more directions, or otherwise to contour the sheet material as frequently required for at least some of the purposes for which the material of the present invention is provided, this may be done in the molding operation under heat and pressure. The deformable character of the rope cores 4 permits the sheet to be curved in one or more directions, or otherwise contoured in this manner, without distorting the ribs or corrugated formation of the sheet; also without impairing its mechanical strength or its appearance. These are highly important aspects of the invention.

Expt for the addition of an intermediate layer for assuring and facilitating the desired positioning of the cores, the embodiment of the invention illustrated in Figures 3, 4, and 5 is similar to the embodiment of the invention illustrated in Figures 1 and 2, and like parts are designated by primed reference characters corresponding with the reference characters used in Figures 1 and 2.

The intermediate layer for assuring and facilitating the desired positioning of the cores 4' in Figures 3, 4 and 5, is indicated at 10. It has transverse slits 11 through which the longitudinally extending and parallel rope cores 4' are threaded, laced, or woven. The lacing or threading of the rope cores 4' through the slits 11 is preferably done in a manner to stagger the loops 12, formed by the slits 11, so that the loops 12 for each core 4' on one side of the sheet will be generally in transverse alignment with the spaces between the loops 12 for the adjacent cores.

The modified form of weaving of the rope cores 4'' through the slits 11' of the intermediate sheet 10' shown in Figure 6 is similar to Figure 4, except that the loops 12' for the respective cores 4'' overlap, as viewed in a direction transversely of the sheet.

The layers 1' and 2', with the intermediate layer 10 and cores 4' therebetween, are passed together under heat and pressure to the form shown in Figure 5, and cured as described in connection with the preceding embodiment of the invention. This produces the form of finished sheet material as shown in Figure 5, with the layers 1' and 2' and the intermediate layer 10 and cores 4 firmly bound together into a unitary structure. This finished structure, because of the manner in which it is formed and the deformable character of the rope cores 4', is adapted to be curved in one or more directions or otherwise contoured, as described in connection with the preceding embodiment of the invention, and with the same advantageous results.

In the further modification of the invention illustrated in Figure 7, the longitudinally extending parallel cores 4''' are laced, threaded, or woven through slits 11'' in the intermediate plastic impregnated sheet 10'', as in Figure 4. This sheet 10'', with the cores 4''', is used substantially as described in connection with the embodiment of the invention illustrated in Figures 3, 4, and 5.

In Figure 7, however, each core 4''' is in the form of a tubular deformable core comprising a tube of Cellophane a or the like filled with sand b or like material. In practicing the invention in accordance with Figures 7 and 8, the Cellophane tubing a, for the cores 4''', may be made from commercial Cellophane tubing, such as that manufactured by the Humitube Corporation, of Peoria, Illinois. This Cellophane tubing is furnished in flat long spools ¾ of an inch wide and having a longitudinal seam. This Cellophane tubing is heat sealing. In making up the cores 4''' in production, flat Cellophane or other cellulose sheeting may be spooled through a tubular forming die. As the tubing is formed by the die, the sand, or other suitable core material or filling material is introduced into the tubing from a hopper, and a longitudinal seam may be formed, for example, by a rotating heated wheel. Any desired length may be cut off from the tubing thus formed, depending upon the length of laminated structure it is desired to produce. After selection of the appropriate length, the ends of each tube may be sealed by any appropriate sealing means. Ordinary foundry core sand has been found to be satisfactory in making up the cores, although it is to be understood that other suitable materials may be used for this purpose.

The intermediate plastic impregnated layer 10'', with the deformable cores 4'''' threaded or laced through the slits 11'' thereof, is placed between plastic impregnated layers 1''' and 2''' (Figure 8), and the layers 1''' and 2''' and the intermediate layer 10'' and cores 4'''' are pressed together under heat and pressure to the form shown in Figure 8, as described in connection with the embodiment of the invention shown in Figures 3, 4, and 5. After the assembly is brought to form with the parts firmly and securely bound together, and, after curing, the opposite ends of the Cellophane tubing making up the core elements 4'''' are cut off and the sand or other filling material is blown out of the tubes, for example with an air hose, or otherwise removed or eliminated, leaving the ribs 8'' hollow internally, as indicated at 15 in Figure 8. This provides a ribbed laminated plastic impregnated sheet of exceptional strength, combined with light weight.

Where it is desired to curve the ribbed and laminated plastic sheet shown in Figure 8 in one or more directions, or otherwise to contour the same, this may be done as described in connection with the preceding embodiments of the invention. In that case, the sand or other filling is left within the tubular cores 4'''' until after the sheet is curved or contoured as desired. The deformable character of these tubular cores, with the filling material therein, permits curving of the sheet in one or more directions, or otherwise contouring the same without distorting the ribbed or corrugated formation of the sheet and without impairing its mechanical strength or its appearance. After the sheet is brought to the desired curvature or other contour, the sand or other filling is blown out, removed, or eliminated as previously described.

In Figures 9 and 12 the ribbed and laminated plastic impregnated sheet 16 may be formed in accordance with any of the previously described embodiments of the invention, and is shown provided with ribs 17 formed similar to the ribs of the preceding embodiments of the invention. The ribs 17, instead of being parallel, are formed to produce a pattern on the surface of the sheet 16, which pattern defines generally square or polygonal figures over the surface of the sheet. These figures may, of course, be of other shapes, and, in fact, they may, if desired, be shaped to form figures or letters on the surface of the sheet.

The rib formations shown on the sheets illustrated in the remaining figures of the drawings may also be formed in accordance with any of the previously described embodiments of the invention.

In Figure 10 the sheet 18 has the ribs 19 formed of generally serpentine form, spaced substantially equidistant throughout their lengths.

In Figure 11 the sheet 20 has the ribs 21 of generally serpentine form, but instead of being spaced substantially equidistant as in Figure 10, the serpentine ribs 21 are spread away from each other and converge toward each other at alternate positions lengthwise along the ribs.

In Figure 13 the sheet 24 has the ribs 25 in parallel spaced relation on one side of the sheet, and ribs 26 in parallel spaced relation on the opposite side of the sheet and extending at right angles to the ribs 25.

In Figure 14 the sheet 22 has the ribs 23 in the form of a plurality of concentric circular ribs.

In Figure 15 the sheet 25 is similar to the sheet illustrated in Figure 13 but is of compound curvature, i. e., curved in two directions, across and longitudinally of the sheet. This curvature is imparted in the forming operation and as previously described. It is understood that the particular compound curvature illustrated in Figure 15 is illustrative and that this sheet and the other sheets may be curved in only one direction or otherwise contoured within the scope of the present invention.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. The method of forming ribbed and laminated plastic impregnated sheet material which comprises threading deformable cores through slits in an intermediate layer of plastic impregnated sheet material, arranging said intermediate layer with the cores threaded through the slits therein between layers of plastic impregnated sheet material with the assembled layers and cores on a mold having molding cavities in position to receive the cores and portions of said intermediate layer and one of said other layers, and heating and compressing the body thus formed to press the cores and portions of said intermediate layer and one of said other layers into the mold cavities to shape same therein and to unite portions of said intermediate and said other layers between said cores.

2. The method of forming ribbed and laminated plastic impregnated sheet material which comprises threading deformable cores through slits in an intermediate layer of plastic impregnated sheet material, arranging said intermediate layer with the cores threaded through the slits therein between layers of plastic impregnated sheet material, and heating and compressing the body thus formed to unite said layers and cores into a ribbed and laminated plastic impregnated sheet.

3. The method of forming and shaping ribbed and laminated plastic impregnated sheet material which comprises threading deformable cores through slits in an intermediate layer of plastic impregnated sheet material, arranging said intermediate layer with the cores threaded through the slits therein between layers of plastic impregnated sheet material with the assembled layers and cores on a mold having molding cavities in position to receive the cores and portions of said intermediate layer and one of said other layers, and heating and compressing the body thus formed to press the cores and portions of said intermediate layer and one of said other layers into the mold cavity and to impart curvature to said body in one or more directions with said deformable cores in place so as not to distort the ribs formed on the sheet material by said cores or impair the mechanical strength or appearance of the sheet material.

4. The method of forming and shaping ribbed and laminated plastic impregnated sheet material which comprises threading through slits in an intermediate layer of plastic impregnated sheet material cores comprising cellulose tubing containing a filling material, arranging said intermediate layer with the cores threaded through the slits therein between layers of plastic impregnated sheet material with the assembled layers and cores on a mold having molding cavities in position to receive the cores and portions of said intermediate layer and one of said other layers, heating and compressing the body thus formed to press the cores and portions of said intermediate layer and one of said other layers into the mold cavity to shape same therein and to impart curvature to said body in one or more directions with said deformable cores in place between the sheets so as not to distort the ribs formed on the sheet material by said cores or impair the mechanical strength or appearance of the sheet material, and thereafter removing or eliminating the filling material from said tubular cores to provide a light weight body of exceptional strength.

5. As an article of manufacture, a ribbed and laminated plastic sheet material comprising outer layers of plastic impregnated sheet material, an intermediate layer of plastic impregnated sheet material positioned between said outer layers and having slits therein, and deformable cores threaded through the slits in said intermediate layer.

6. As a component part of a ribbed and laminated plastic sheet material, an intermediate layer of plastic impregnated sheet material having slits therein and a deformable core threaded through the slits in said intermediate layer.

7. As an article of manufacture, a curved laminted plastic impregnated sheet having hollow and generally parallel ribs on one side of the sheet and hollow and generally parallel ribs on the other side of the sheet extending generally at right angles to said first ribs, said ribs being of substantially uniform configuration throughout their length and not distorted by the curvature of the sheet.

CHARLES A. SCOGLAND.

REFERENCES CITED

The following references are of record in the file of this patent:

UNITED STATES PATENTS

| Number | Name | Date |
|---|---|---|
| 2,282,168 | Cunnington | May 5, 1942 |
| 2,276,004 | Vidal | Mar. 10, 1942 |
| 1,459,220 | Kemp | Oct. 2, 1923 |
| 1,343,191 | Allcutt | June 15, 1920 |
| 1,806,673 | Daniels | May 26, 1931 |
| 355,140 | Cole | Dec. 28, 1886 |